United States Patent
Anderson et al.

(10) Patent No.: US 9,744,847 B2
(45) Date of Patent: Aug. 29, 2017

(54) FLUSH MOUNT ACTIVE GRILLE SHUTTER AND ACTUATOR

(71) Applicant: Ford Global Technologies, LLC, Dearborn, MI (US)

(72) Inventors: Ronald L. Anderson, Newport Beach, CA (US); David Brian Glickman, Southfield, MI (US); Aaron Peter Klop, Bloomfield Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/803,181

(22) Filed: Jul. 20, 2015

(65) Prior Publication Data

US 2017/0021720 A1  Jan. 26, 2017

(51) Int. Cl.
*B60K 11/08* (2006.01)

(52) U.S. Cl.
CPC ......... *B60K 11/085* (2013.01); *B60Y 2200/11* (2013.01)

(58) Field of Classification Search
CPC ......... B60K 11/085; F24F 13/12; F24F 13/16; F24F 13/18
See application file for complete search history.

(56) References Cited

U.S. PATENT DOCUMENTS

| | | | | |
|---|---|---|---|---|
| 1,973,078 A * | 9/1934 | Jackson | ............... | B60K 11/085 165/98 |
| 3,393,627 A * | 7/1968 | Eurich | ..................... | F24F 13/12 454/324 |
| 3,426,668 A * | 2/1969 | Komperda | .............. | F24F 13/08 137/625.33 |
| 3,441,082 A * | 4/1969 | Fragnito | ................... | F24F 3/04 165/123 |
| 3,528,359 A * | 9/1970 | Sand | ....................... | F24F 13/12 454/324 |
| 4,410,032 A * | 10/1983 | Mori | .................... | B60K 11/085 123/41.06 |
| 5,984,775 A * | 11/1999 | Lee | ......................... | F24F 13/12 454/186 |
| 6,340,329 B1 * | 1/2002 | Park | ...................... | F24F 11/053 454/258 |
| 6,415,622 B2 * | 7/2002 | Kim | ....................... | F24F 1/0011 62/408 |
| 6,439,328 B1 * | 8/2002 | Vaillancourt | ........ | B60K 11/085 123/41.58 |
| 6,945,867 B2 * | 9/2005 | Park | ...................... | F24F 13/12 454/324 |

(Continued)

FOREIGN PATENT DOCUMENTS

DE  102006053883 A1  5/2008
EP  2412556 B1  5/2013

*Primary Examiner* — Katy M Ebner
(74) *Attorney, Agent, or Firm* — Jason Rogers; Brooks Kushman P.C.

(57) ABSTRACT

A grille shutter includes a housing, a blocking plate and an actuator. The housing comprises a grille defining a plurality of airflow openings and defining at least one guide slot. The blocking plate includes a plurality of spaced gates movable between a blocking position covering the airflow openings and an open position uncovering the airflow openings. The actuator includes a motor driving a gear set along a guide slot to move the blocking plate between the blocking and open positions.

13 Claims, 4 Drawing Sheets

(56) References Cited

U.S. PATENT DOCUMENTS

| | | | | |
|---|---|---|---|---|
| 7,195,556 | B1* | 3/2007 | Fichtelman | E04D 13/152 454/260 |
| 8,316,974 | B2* | 11/2012 | Coel | B60K 11/085 165/44 |
| 9,341,388 | B2* | 5/2016 | Francescon | F24F 13/12 |
| 9,393,861 | B2* | 7/2016 | Hori | B60K 11/04 |
| 2007/0227794 | A1* | 10/2007 | Diehl | B60K 11/085 180/68.4 |
| 2010/0218497 | A1* | 9/2010 | Pettersson | B60K 11/04 60/599 |
| 2011/0147631 | A1* | 6/2011 | Menassa | F24F 13/12 251/205 |
| 2012/0138174 | A1* | 6/2012 | Baek | G05D 23/192 137/561 R |
| 2012/0186890 | A1* | 7/2012 | Hori | B60K 11/085 180/68.3 |
| 2014/0090610 | A1* | 4/2014 | Higuchi | B60K 11/085 123/41.58 |
| 2014/0194052 | A1* | 7/2014 | Asano | B60K 11/085 454/335 |
| 2014/0273806 | A1* | 9/2014 | Frayer, III | B60K 11/085 454/335 |
| 2014/0370795 | A1 | 12/2014 | Klop et al. | |
| 2015/0072610 | A1* | 3/2015 | Coles | F24F 13/12 454/324 |
| 2015/0140922 | A1* | 5/2015 | Babur | F24F 13/12 454/298 |
| 2016/0096425 | A1* | 4/2016 | Walters | B60K 11/085 180/68.1 |

\* cited by examiner

FLUSH MOUNT ACTIVE GRILLE SHUTTER AND ACTUATOR

TECHNICAL FIELD

This disclosure relates to grille shutters and actuators that open and close vehicle grille openings.

BACKGROUND

Grille shutter systems are used to regulate airflow to radiators, condensers and other systems disposed in an engine compartment. Grille shutter systems also may be used to optimize aerodynamic drag by partially or completely blocking airflow.

Smooth, flush surfaces are best for reducing aerodynamic drag. Environmental conditions such as precipitation, freezing temperatures and debris prevented prior art grille shutter systems from being flush mounted and are recessed behind the styled grille. Grille shutters are located behind the styled grille for protection of the shutters and to mitigate reliability and durability concerns.

Grille styles are dictated by consumer preferences and the forms and shapes of grilles have compound curved surfaces that are relatively complex. As a result, shutter systems are generally provided as flat panels that are assembled behind the styled grille. In this location, the effectiveness of the shuttering system in reducing aerodynamic drag is reduced. Assembling a flat panel shuttering system behind the styled grille also increases packaging space requirements in the front end of the vehicle.

This disclosure is directed to addressing the above problems and other problems as summarized below.

SUMMARY

According to one aspect of this disclosure, a grille shutter is disclosed that includes a housing, a blocking plate and an actuator. The housing comprises a grille defining a plurality of airflow openings and defining at least one guide slot. The blocking plate includes a plurality of spaced gates movable between a blocking position covering the airflow openings and an open position uncovering the airflow openings. The actuator includes a motor driving a gear set along the guide slot to move the blocking plate between the blocking and open positions.

According to other aspects of this disclosure, the housing may further comprise an upper flange and a lower flange on each side of the housing that define a plurality of guide slots in each of the upper flanges and lower flanges. The guide slots extend rearward and vertically away from the grille to facilitate moving the blocking plate between the blocking position in which the blocking plate is flush with the grille and the open position in which the gates of the blocking plate is shifted in a rearward direction and are vertically offset from the airflow openings.

The grille shutter may further comprise a driveshaft connected to the actuator on a first side of the housing and extending in a transverse direction to a second side of the housing. The actuator drives the driveshaft along a first guide slot defined by a first flange on a first side of the housing and follows a second guide slot defined by a second flange on a second side of the housing. The lower flanges define first and second guide slots that extend rearward and vertically away from the grille and a first pin and a second pin provided on the blocking plate that are received in the first and second guide slots.

The gear set may include a rack gear and a pinion gear. The rack gear may be provided adjacent a guide slot defined by the housing and the pinion gear may be rotated by the motor to shift the blocking plate between the blocking position and the open position.

The motor may be actuated to move the blocking plate to any incremental position between the blocking position and the open position.

The blocking plate may further comprise a plurality of fixed links connecting the gates together in an array.

According to another aspect of this disclosure, a grille shutter is disclosed that includes a housing, a blocking member and an actuator. The housing includes a grille defining a plurality of airflow openings and a guide slot. The blocking member has a plurality of spaced gates connected by a plurality of fixed links. The blocking member is movable between a blocking position covering the airflow openings and an open position uncovering the airflow openings. The actuator moves the blocking member between the blocking and open positions.

The actuator of the grille shutter described in the preceding paragraph may include includes a motor, a rack gear and a pinion gear. The rack gear may be provided adjacent a guide slot defined by the housing, and the pinion gear may be rotated by the motor to shift the blocking member between the blocking position and the open position. The motor may be actuated to move the blocking member to any incremental position between the blocking position and the open position.

According to a further embodiment, a grille assembly is disclosed that includes a fascia panel, a blocking member, a rack gear and a pinion gear. The fascia panel defines an opening coverable by a grille defining a plurality of airflow passages. The blocking member includes a plurality of plates disposed to block the airflow passages in a flush position. The rack gear and pinion gear are operatively connected between the grille and blocking member to move the blocking member vertically and rearward behind the grille from a flush position to a recessed air flow position.

The blocking member may include a plurality of spaced planar gates connected by a plurality of fixed links.

The pinion gear is operatively connected to a motor that drives the pinion gear in a first rotary direction to open the airflow passages to a greater extent and in a second rotary direction to close the airflow passages to a greater extent. The motor may be actuated to move the blocking member to any incremental position between the flush position and the air flow position.

The grille assembly may further comprise a pair of flanges extending in a longitudinal vehicle direction behind the grille on opposite lateral sides of the grille that define a pair of slots with the rack gear being disposed below and parallel to one of the slots. A driveshaft may be assembled within the pair of slots and attached to the pinion gear to move within the slots as the pinion gear is rotated to move along the rack gear.

The grille assembly may further comprise a housing that includes a pair of upper flanges and a pair of lower flanges that each define a pair of lower guide slots. The pair of lower guide slots each receives a guide pin that moves along the guide slots when the driveshaft moves within the slots as the pinion gear is rotated.

The above aspects of this disclosure and other aspects are described in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
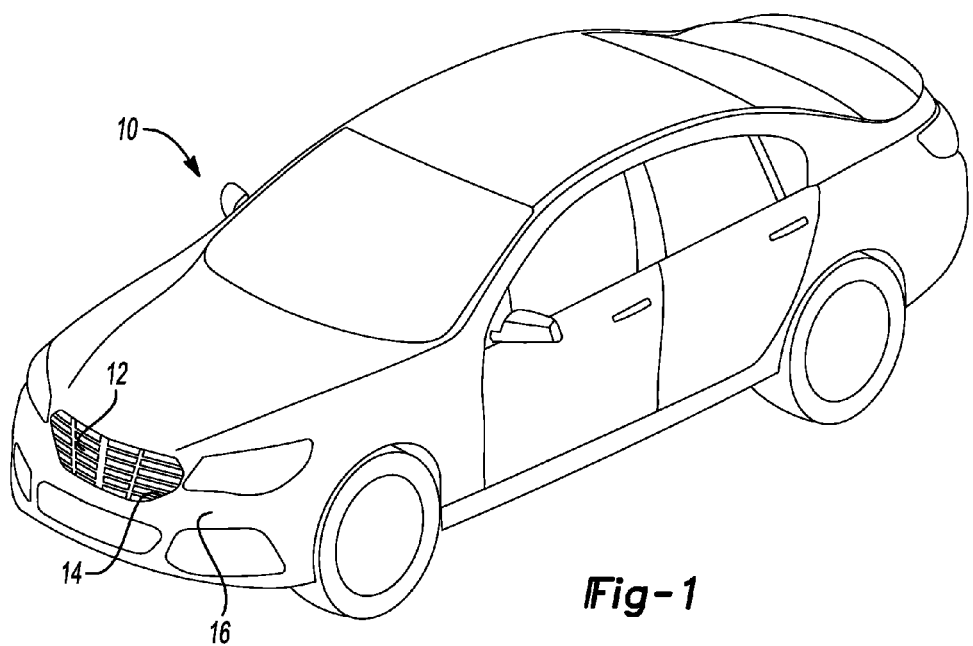
FIG. 1 is a side/front perspective view of a vehicle including a grille and grille shutter made according to one aspect of this disclosure.

Referring to FIG. 1, a vehicle 10 is illustrated that includes a grille 12 disposed in a grille opening 14 defined in a front fascia panel 16. The grille 12 is backed by a grille shutter that may be moved between a closed position (air flow blocking position) and an open position (air flow unblocked position) as will be described in greater detail below.

Figure 2:
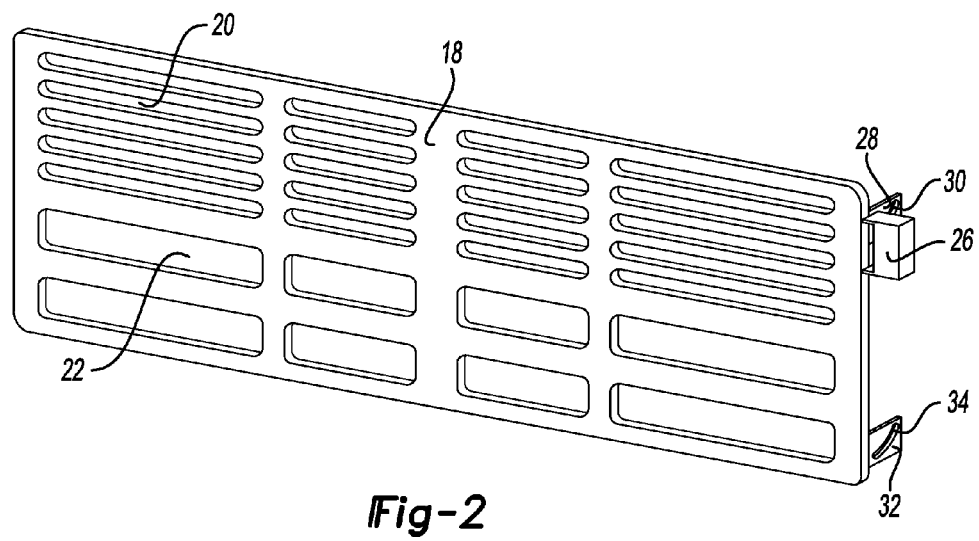
FIG. 2 is a front perspective view of a grille and shutter actuator.

Referring to FIG. 2, the grille 12 defines a plurality of upper air flow openings 20 and a plurality of lower air flow openings 22. A motor 26, or motor housing, is shown adjacent the grille 12 and assembled to an upper flange 28 that defines an upper guide slot 30. A lower flange 32 is also illustrated that defines a lower guide slot 34. The illustrated grille 12 is a planar member but the grille may be contoured to a desired shape.

Figure 3:
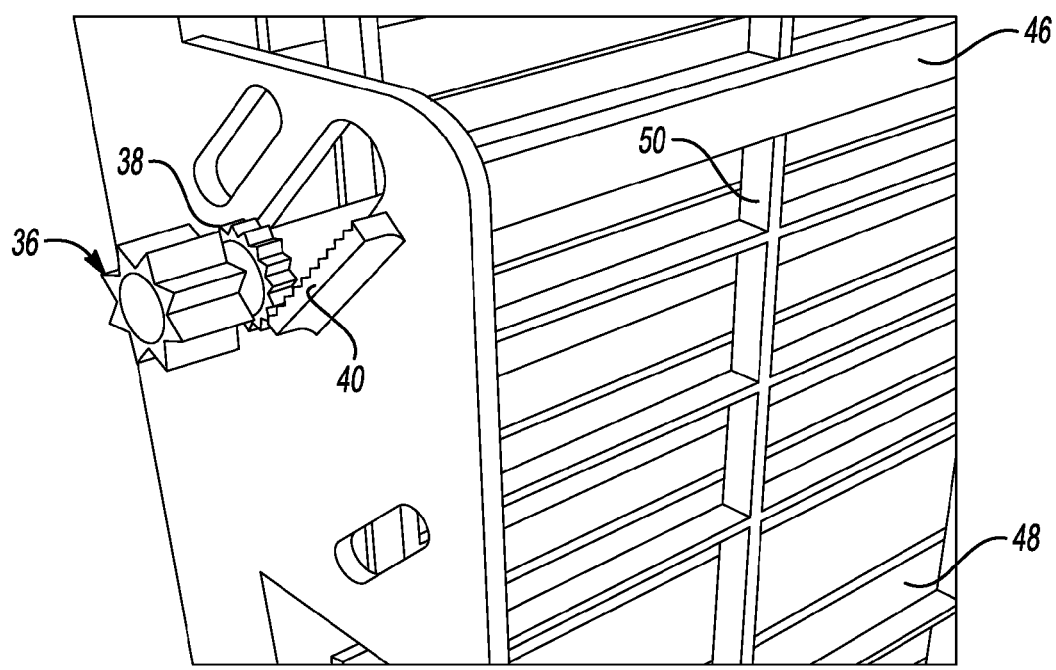
FIG. 3 is a fragmentary perspective view of the grille shutter and actuator.

Referring to FIG. 3, an actuator is generally indicated by reference numeral 36 and is partially illustrated with the motor 26 removed. The actuator 36 includes a pinion gear 38 that engages a rack gear 40. Rotation of the pinion gear 38 in a clockwise rotary direction as viewed in FIG. 3 causes the pinion gear to climb the rack gear 40 and moves a blocking member 46, or blocking panel, from the closed position (air flow blocking) toward the open position (air flow unblocking). Rotation of the pinion gear 38 in a counter-clockwise rotary direction causes the pinion gear to move downward along the rack gear 40 and moves the blocking member 46 from the open position toward the closed position.

The blocking member 46 may be fabricated as a panel from a single sheet or may be an assembly of a plurality of gates 48 that are secured together by a plurality of fixed links 50. the links may extend vertically and horizontally to connect the gates 48 in an array that corresponds to the location of the air flow openings 22 formed in the grille 12.

Figure 4:
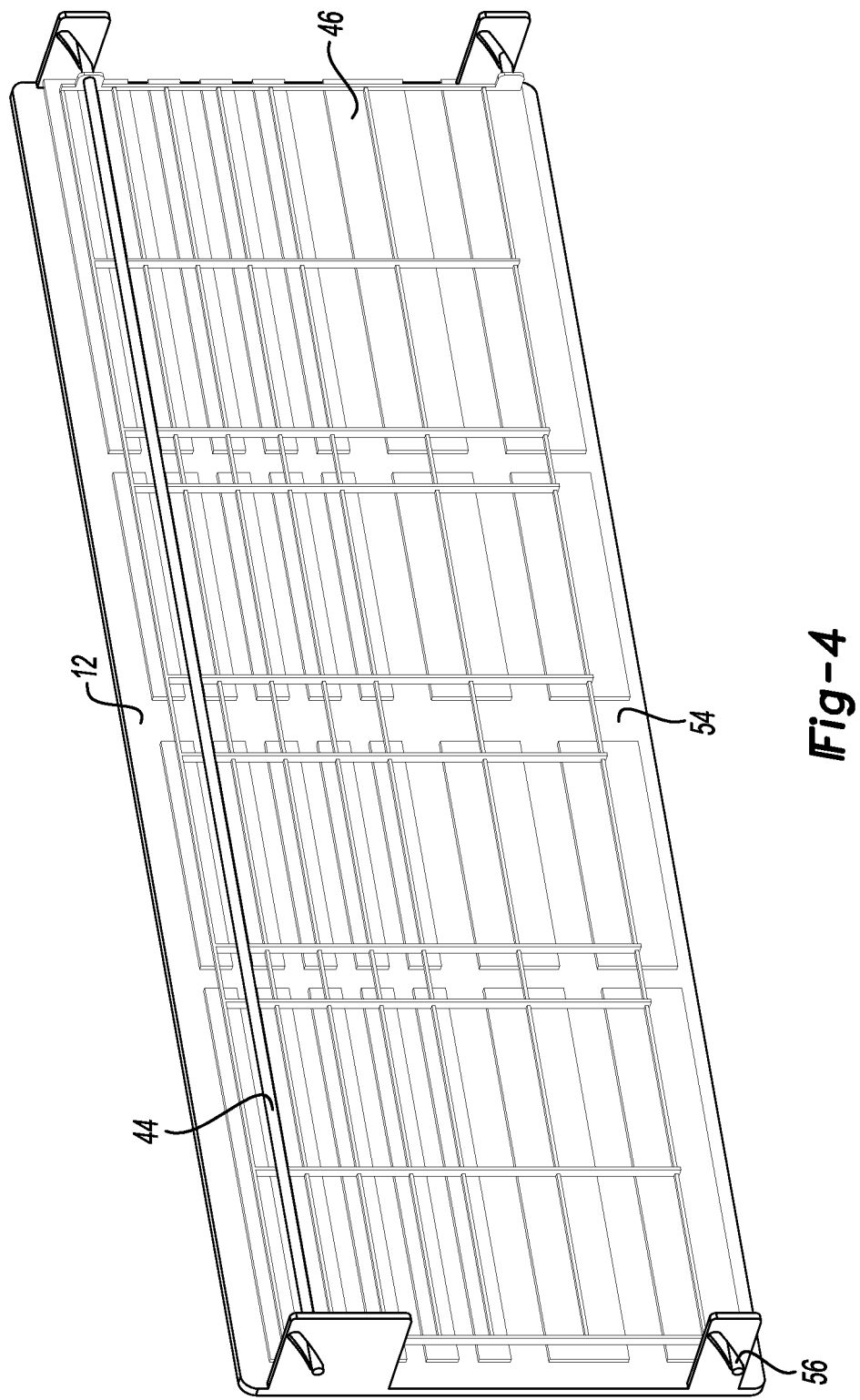
FIG. 4 is a rear perspective view of the grille shutter in the closed or flush position.
Figure 5:
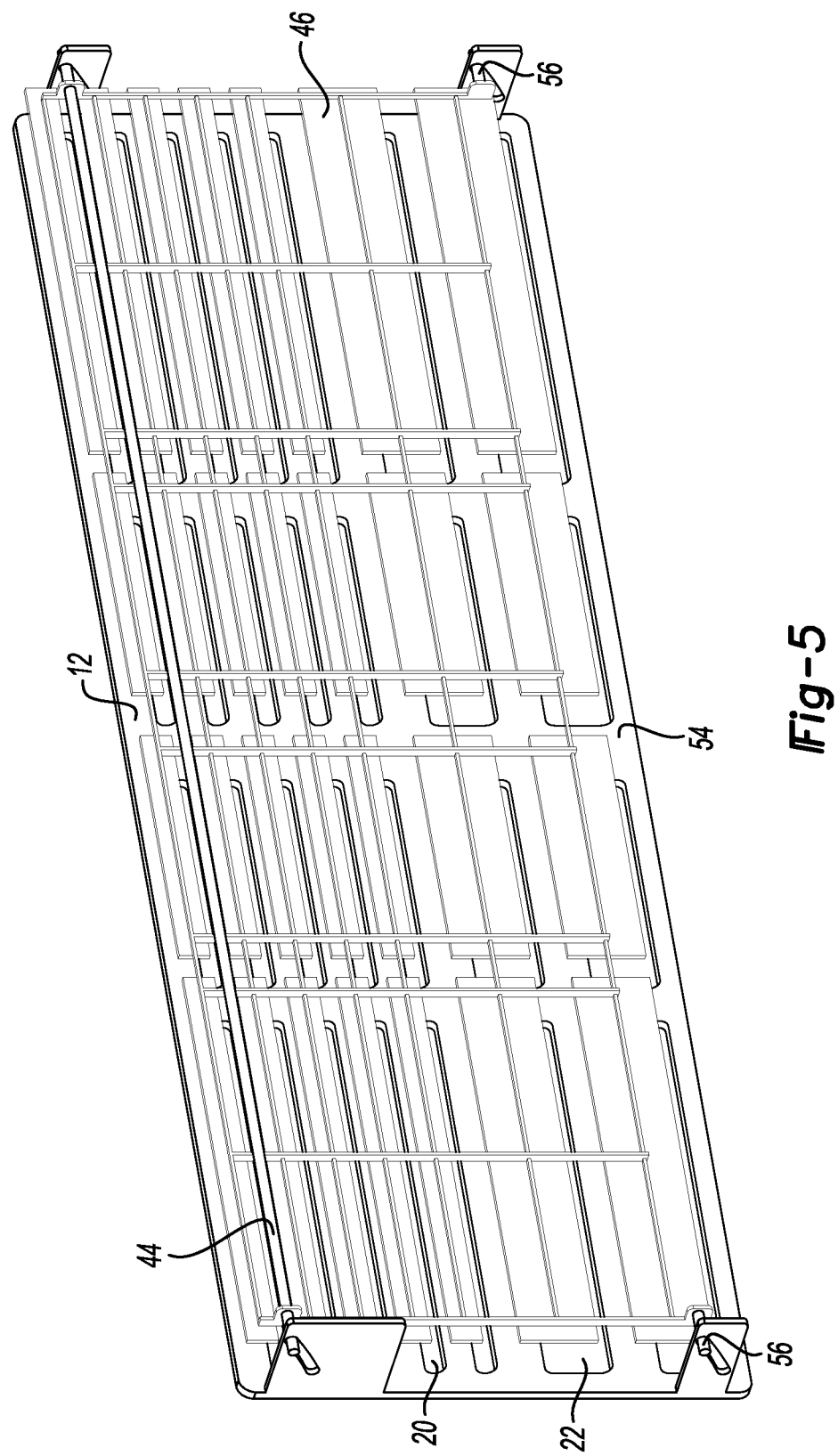
FIG. 5 is a rear perspective view of the grille shutter in the open position.

Referring to FIGS. 4 and 5, the grille 12 and blocking member 46 are shown in FIG. 4 in the closed position in which the blocking member is flush with a rear surface 54 of the grille 12. The illustrated blocking member is planar in shape but may be contoured to mate with the rear surface 54 of the grille 12. In this position, air flow through the air flow openings 20, 22 is effectively prevented and drag caused by the grille 12 is reduced. The grille 12 and blocking member 46 are shown in FIG. 5 in the open position in which the blocking member 46 is spaced from the rear surface 54 of the grille 12. In the open position, air flow through the air flow openings 20, 22 is permitted to flow through the grille 12 to the radiator and air conditioning condenser (not shown). Drag created by air flowing through the grille 12 is increased. The actuator 36 may be used to position the blocking member 46 at any point along the rack gear 40 (shown in FIG. 3) to allow partial air flow through the grille 12.

Movement of the blocking member 46 is guided by the driveshaft 44 following the upper guide slot 30 in the upper flange 28 on opposite sides of the grille 12. The lower flanges 32 define lower guide slots 34 that control the movement of the blocking member 46 that includes guide pins 56. The guide pins 56 are received in the lower guide slots 34 to retain the blocking member 46 in a substantially parallel orientation relative to the grille 12.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A grille shutter comprising:
a housing including a grille defining a plurality of airflow openings and defining at least one guide slot, wherein the housing further comprises an upper flange and a lower flange on each of first and second sides of the housing, and wherein the at least one guide slot further comprises a plurality of guide slots wherein one guide slot is provided in each of the upper flanges and lower flanges;
a blocking plate having a plurality of spaced gates movable between a blocking position covering the airflow openings and an open position uncovering the airflow openings; and
an actuator including a motor driving a gear set along one of the guide slots to move the blocking plate between the blocking and open positions, a driveshaft connected to the actuator on the first side of the housing and extending in a transverse direction to the second side of the housing, wherein the actuator drives the driveshaft along a first guide slot defined by a first flange on the first side of the housing, and wherein the driveshaft follows a second guide slot defined by a second flange on the second side of the housing.

2. The grille shutter of claim 1 wherein the guide slots extend rearward and vertically away from the grille to facilitate moving the blocking plate between the blocking position in which the blocking plate is flush with the grille and the open position in which the gates of the blocking plate are shifted in a rearward direction and are vertically offset from the airflow openings.

3. The grille shutter of claim 1 wherein the first flange is an upper flange and the second flange is an upper flange.

4. The grille shutter of claim 3 wherein the lower flanges define first and second guide slots that extend rearward and vertically away from the grille, and further comprising a first pin and a second pin provided on the blocking plate that are received in the first and second guide slots.

5. The grille shutter of claim 1 wherein the gear set includes a rack gear and a pinion gear, wherein the rack gear is provided adjacent a guide slot defined by the housing, and wherein the pinion gear is rotated by the motor to shift the blocking plate between the blocking position and the open position.

6. The grille shutter of claim 5 wherein the motor may be actuated to move the blocking plate to any incremental position between the blocking position and the open position.

7. The grille shutter of claim 1 wherein the blocking plate further comprises a plurality of fixed links connecting the gates together in an array.

8. A grille assembly comprising:
- a fascia panel defining an opening coverable by a grille defining a plurality of airflow passages;
- a blocking member including a plurality of plates disposed to block the airflow passages in a flush position;
- a rack gear and a pinion gear operatively connected between the grille and blocking member to move the blocking member vertically and rearward behind the grille from a flush position to a recessed air flow position;
- a pair of flanges extending in a longitudinal vehicle direction behind the grille on opposite lateral sides of the grille that define a pair of slots, wherein the rack gear is disposed below and parallel to one of the slots; and
- a driveshaft assembled within the pair of slots and attached to the pinion gear to move within the slots as the pinion gear is rotated to move along the rack gear.

9. The grille assembly of claim 8 wherein the blocking member includes a plurality of spaced planar gates connected by a plurality of fixed links.

10. The grille assembly of claim 8 wherein the pinion gear is operatively connected to a motor that drives the pinion gear in a first rotary direction to open the airflow passages to a greater extent and in a second rotary direction to close the airflow passages to a greater extent.

11. The grille assembly of claim 10 wherein the motor may be actuated to move the blocking member to any incremental position between the flush position and the air flow position.

12. The grille assembly of claim 8 further comprising:
- a housing wherein the pair of flanges include a pair of upper flanges, wherein the housing further includes a pair of lower flanges that each define a pair of lower guide slots, and wherein the pair of lower guide slots each receive a guide pin, wherein the guide pins move along the guide slots when the driveshaft moves within the slots as the pinion gear is rotated.

13. A grille shutter comprising:
- a housing including a first flange and a second flange on opposite lateral sides, the flanges each defining a guide slot;
- a grille defining a plurality of openings;
- a blocking plate movable between a blocking position covering the openings and an open position uncovering the openings; and
- a motor driving a transversely extending driveshaft extending through both guide slots to drive the blocking plate between the blocking and open positions.

* * * * *